(12) United States Patent
Slik

(10) Patent No.: US 9,400,802 B2
(45) Date of Patent: Jul. 26, 2016

(54) SYSTEM AND METHOD FOR PROVIDING A UNIFIED STORAGE SYSTEM THAT SUPPORTS FILE/OBJECT DUALITY

(71) Applicant: NetApp, Inc., Sunnyvale, CA (US)

(72) Inventor: David Slik, Burnaby (CA)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/702,559

(22) Filed: May 1, 2015

(65) Prior Publication Data
US 2015/0234815 A1 Aug. 20, 2015

Related U.S. Application Data

(63) Continuation of application No. 14/088,026, filed on Nov. 22, 2013, now Pat. No. 9,043,277, which is a continuation of application No. 13/168,431, filed on Jun. 24, 2011, now Pat. No. 8,620,865.

(51) Int. Cl.
G06F 17/30 (2006.01)
H04L 29/08 (2006.01)

(52) U.S. Cl.
CPC ........ *G06F 17/302* (2013.01); *G06F 17/30171* (2013.01); *H04L 67/1097* (2013.01)

(58) Field of Classification Search
CPC .................................................. G06F 17/30171
USPC .......................... 707/609, 695, 781, 782, 626
See application file for complete search history.

(56) References Cited

U.S. PATENT DOCUMENTS

| | | |
|---|---|---|
| 7,836,056 B2 | 11/2010 | Meijer et al. |
| 2008/0005091 A1 | 1/2008 | Lawler et al. |
| 2008/0140679 A1 | 6/2008 | Deyo et al. |
| 2008/0306908 A1 | 12/2008 | Agrawal et al. |
| 2010/0094847 A1 | 4/2010 | Malan et al. |
| 2011/0137966 A1 | 6/2011 | Srinivasan et al. |

FOREIGN PATENT DOCUMENTS

WO 9930254 A1 6/1999

OTHER PUBLICATIONS

Bernstein P. A., et al., "Concurrency Control and Recovery in Database Systems Chapter 5: Multiversion Concurrency Control," Concurrency Control and Recovery in Database Systems, Jan. 1, 1987, pp. 143-166, XP007914376, ISBN: 978-0-201-10715-9.
International Preliminary Report on Patentability for Application No. PCT/US2012/041305 mailed on Dec. 24, 2013, 9 pages.
International Search Report and Written Opinion for Application No. PCT/US2012/041305 mailed on Feb. 19, 2013, 11 pages.
Supplementary European Search Report for Application No. EP12802529 mailed on Aug. 19, 2015, 2 pages.

*Primary Examiner* — Shahid Alam
(74) *Attorney, Agent, or Firm* — Gilliam IP PLLC

(57) ABSTRACT

Methods and systems that permit file protocols and object protocols to co-exist using a file namespace and an object namespace in a unified storage system are disclosed. Data stored in the unified storage system are file-objects that preserve the behaviors expected by both file clients and object clients.

16 Claims, 24 Drawing Sheets

SYSTEM AND METHOD FOR PROVIDING A UNIFIED STORAGE SYSTEM THAT SUPPORTS FILE/OBJECT DUALITY

CROSS-REFERENCE TO RELATED APPLICATIONS

This application is a continuation application of U.S. patent application Ser. No. 14/088,026, filed Nov. 22, 2013, entitled "SYSTEM AND METHOD FOR PROVIDING A UNIFIED STORAGE SYSTEM THAT SUPPORTS FILE/OBJECT DUALITY", which is a continuation application of U.S. patent application Ser. No. 13/168,431 filed Jun. 24, 2011, entitled "SYSTEM AND METHOD FOR PROVIDING A UNIFIED STORAGE SYSTEM THAT SUPPORTS FILE/OBJECT DUALITY", now issued as U.S. Pat. No. 8,620,865 on Dec. 31, 2013, the entire contents of which are hereby incorporated by reference.

TECHNICAL FIELD

At least one embodiment of the present disclosure pertains to network storage systems, and more particularly, to methods and systems for providing both file protocol access and object protocol access to read and modify data stored in a unified storage system.

BACKGROUND

Network based storage, or simply "network storage", is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

There are multiple mechanisms (or protocols) by which a user may wish to access data stored in a network storage system. For example, consider a case where a user wishes to access a document stored at a particular location in a network storage system. The user may use a file protocol, such as a Network File System (NFS) protocol or Common Internet File System (CIFS) protocol, to access the document over a local area network in a manner similar to how local storage is accessed. The user may also use an object protocol, such as the Hypertext Transfer Protocol (HTTP) protocol or the (Cloud Data Management Interface (CDMI) protocol, to access stored data over a local area network, or over a wide area network such as the Internet.

Additionally, object clients using object protocols expect significantly different behaviors when accessing and modifying data when compared to file protocols (e.g. CIFS and NFS). For example, if two file clients concurrently modify and read a file using file protocols, their requested writes and reads are performed as a series of non-atomic write and read operations. These write and read operations are either denied (as a result of access being denied because the file is locked by another file client), or are performed sequentially on a per-client basis, but concurrently across clients. This can result in a situation where the client reading from the file receives a mixture of data as it existed before it was updated by the writing client and data that has been updated by the writing client. Furthermore, the mixture of old and new data is highly timing dependent, and is often non-deterministic in nature. For file clients, this is considered to be undesired behavior, and is typically avoided by using file lock mechanisms to prevent concurrent operations. Furthermore, if two or more clients write to the same location within the same file, the later write overwrites the earlier write, and when interleaved, can result in data loss and corruption.

In contrast, the entirety of modifications to and reading from an object using object protocols is atomic, that is, all object writes and reads are performed in the context of the state of the entire object at the time the operation is performed, rather than as a series of individual operations that create intermediate states as they are applied. With atomic transactions, the entire set of write operations or the entire set of read operations are performed atomically, such that a client reading the contents of the object will either get the state of the object before the writes were applied, or the state of the object after the writes were applied, but never a mixture of the state before and the state after the writes are applied. This means that for object protocols, concurrent clients always interact with a consistent state of the data stored within an object, regardless of the number and type of operations in progress. Due to the atomic nature of object updates, versions of the object file are also easily supported and are often expected by object clients to handle situations that would typically be denied by file locking when using file protocols. This permits object protocols to be used in situations where distributed, wide-area, and disconnected operations prevent file protocols from being effectively used.

Traditional storage systems do not permit read access and write access to a common file system using concurrent file protocol and object protocol, and do not fully conform to the semantics required to provide full file protocol and object protocol duality.

BRIEF DESCRIPTION OF THE DRAWINGS

Examples of a unified storage system that permits both file protocol access and object protocol access to a file-object are illustrated in the figures. The examples and figures are illustrative rather than limiting.

DETAILED DESCRIPTION

Described in detail below is a system that implements concurrent file and object protocol access of a stored file-object as part of a unified storage system. To a client, a file-object exhibits both expected standard file behaviors that conform to file protocol semantics when accessed via a file protocol, and expected object behaviors that conform to object protocol semantics when accessed via an object protocol, even when accesses are performed by both types of protocols concurrently. This type of file/object duality is implemented through maintaining a file representation of the file-object and object representation(s) of the file-object. When a file-object is modified by a client via a file protocol, the client's transactions manipulate a "standard file" representation of the file-object. When a file-object is modified by a client via an object protocol, the client's transactions manipulate the stored object representation, and the file-object includes versions of the object representation that represent the different states of the object. The standard file representation does not exhibit any object behaviors, nor does a file protocol client need to have any visibility into the object representation states, although this can be implemented by extending the file protocol in one embodiment. By maintaining a separate standard file representation for accommodating file protocol operations and separate object states for accommodating object protocol operations, the file-object implementation ensures that interactions between protocols do not introduce unexpected behaviors.

Further, a file namespace is used by the file protocol and an object namespace is used by the object protocol to locate appropriate representations of the stored data, where a file namespace is a mechanism that allows users or applications to name and organize file representations stored in the unified storage system, and an object namespace is a mechanism that allows users or applications to name and organize object representations stored in the unified storage system.

System Environment

Figure 1:
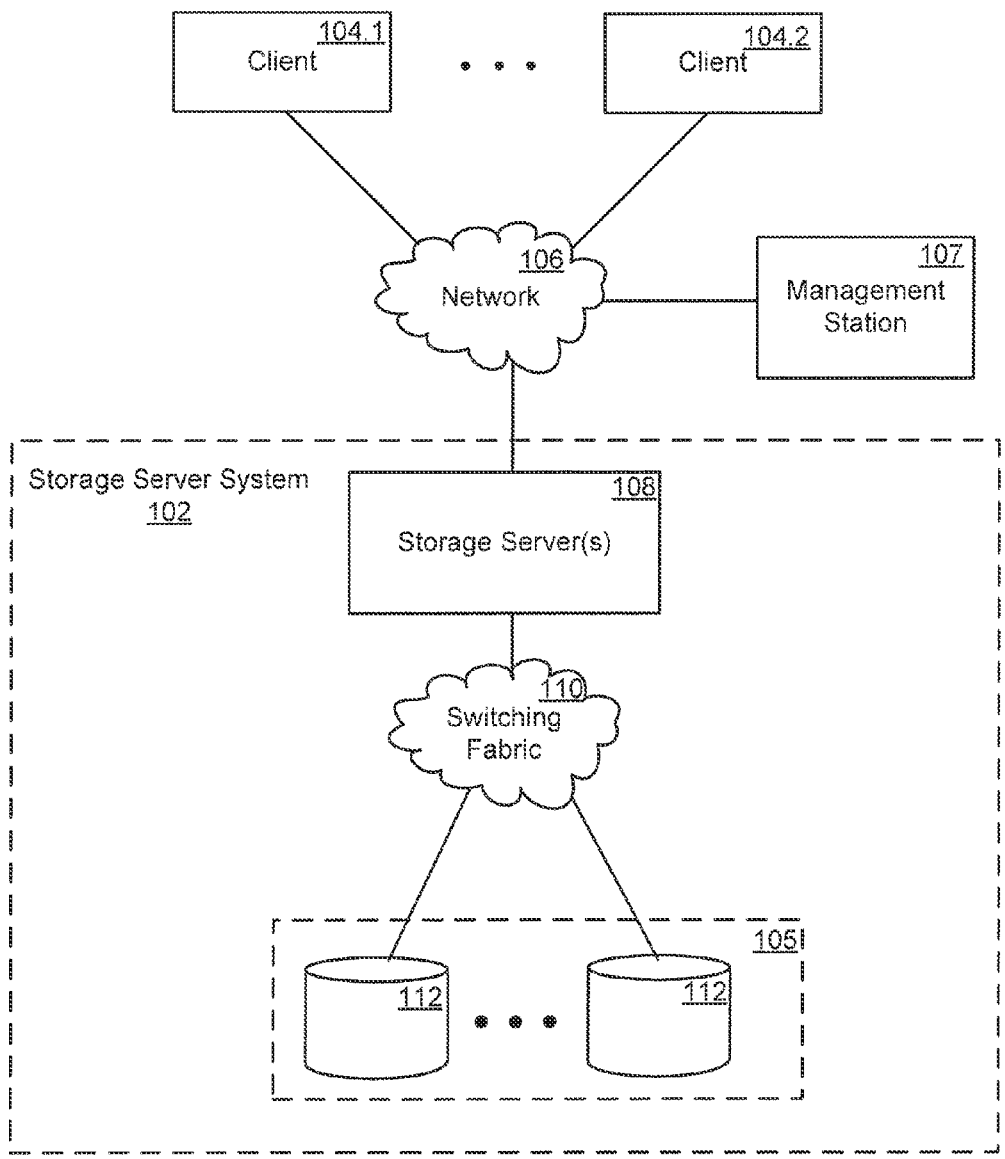
FIG. 1 illustrates a network storage environment in which the present disclosure can be implemented.

FIG. 1 shows a network configuration in which the techniques introduced here can be implemented. In particular, FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes at least one storage server 108, a switching fabric 110, and a number of mass storage devices 112, such as disks, in a mass storage subsystem 105. Alternatively, some or all of the mass storage devices 112 can be other types of storage, such as flash memory, solid-state drives (SSDs), tape storage, etc.

The storage server (or servers) 108 may be, for example, one of the FAS-xxx family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a Fibre Channel Protocol interface (FCP) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2 in a conventional manner. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., flat, hierarchical or digraph) set of stored logical containers of data (e.g., volumes, logical unit numbers (LUNs), directories, files, objects). Note that a "file system" does not have to include or be based on "files" per se as its units of data storage. The storage server 108 includes a storage operating system (not shown) to control its basic operations (e.g., reading and writing data in response to client requests). In one embodiment, the techniques introduced here are implemented in the operating system of storage server 108 of FIG. 1, shown in more detail in FIG. 2 below.

Figure 2:
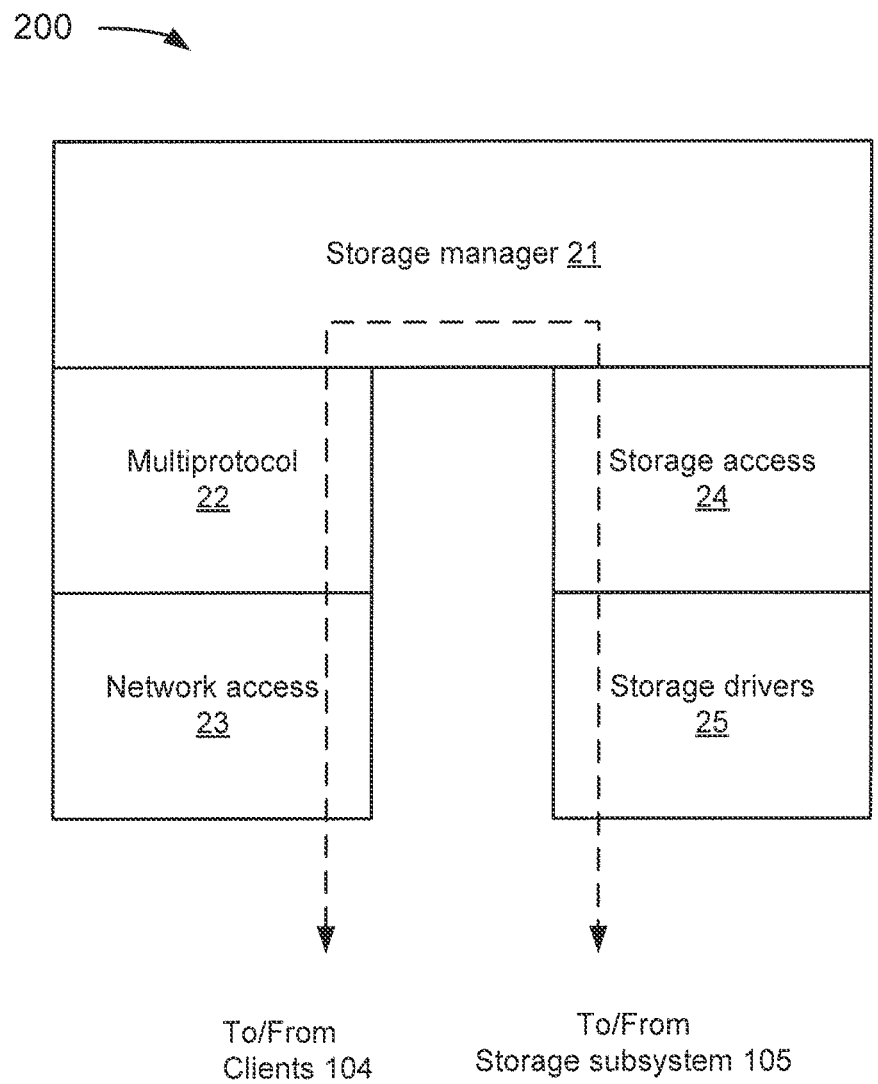
FIG. 2 is a block diagram of an example architecture of a storage operating system in a storage server.

FIG. 2 schematically illustrates an example of the architecture of the storage operating system 200 in the storage server 108. The storage operating system 200 includes several modules, or "layers". These layers include a storage manager 21, which is the core functional element of the storage operating system 20. The storage manager 21 is application-layer software which imposes a structure on the data stored in the storage devices 112.

To allow the storage server 108 to communicate over the network 106 (e.g. with clients 104), the storage operating system 200 also includes a multiprotocol layer 22 and a network access layer 23, logically "under" the storage manager 21. The multiprotocol 22 layer implements various higher-level network protocols, including file protocols and object protocols, such as Network File System (NFS), Common Internet File System (CIFS), Hypertext Transfer Protocol (HTTP), Cloud Data Management Interface (CDMI), Internet small computer system interface (iSCSI), and/or backup/mirroring protocols. A single storage operating system 200 can handle both file protocol and object protocol requests.

Also, to allow the storage server 108 to communicate with the storage devices 112, the storage operating system 200 includes a storage access layer 24 and an associated storage driver layer 25 logically under the storage manager 21. The storage access layer 24 implements a higher-level disk storage protocol, such as RAID-4 RAID-5 or RAID-DP, while the storage driver layer 25 implements a lower-level storage device access protocol, such as Fibre Channel Protocol (FCP) or small computer system interface (SCSI).

The storage operating system 20 can have a distributed architecture. For example, the multiprotocol layer 22 and network access layer 23 can be contained in an N-module (e.g., N-blade) while the storage manager 21, storage access layer 24 and storage driver layer 25 are contained in a separate D-module (e.g., D-blade). The N-module and D-module communicate with each other (and, possibly, other N- and D-modules) through some form of physical interconnect.

File Protocol Semantics

File clients use file protocol semantics to access and modify stored files. When a file client uses file protocol to update a standard file, the file is first opened. The file client then writes data to and/or reads data from the file as a series of individual write or read operations. File clients typically use a block-based programming model where small blocks, ranging from half a kilobyte to 64 kilobytes in size, are written to or read from a file in each write or read transaction. As a result, individual write or read operations are individually atomic, but the series of write or read operations are not atomic.

Further, because most file clients evolved from earlier non-networked systems, file clients are rarely designed to support multiple concurrent readers and writers. Thus, a second client performing a series of read operations on a file while a first client is performing a series of write operations on the same file may get a corrupt mixture of older and newer data if the read and write operations are to overlapping locations within the file. Additionally, if two or more clients concurrently write to overlapping locations within the same file, the client that performs write operations to the file location later in time will typically overwrite the write operations to the file location performed earlier in time, which may result in a corrupt mixture of the writes from the two clients being persisted to storage, and resulting in data loss.

When multi-client concurrency is expected, file locking mechanisms are typically used by file protocol clients to ensure that only a single writer has exclusive access to a file, or that only readers have access to the file. When locking is implemented, a client that intends to modify a the and avoid concurrency issues must first claim a write lock on the file from the operating system. A write lock, once obtained, prevents concurrent access, and when an attempt to lock a file is denied, can be used to notify other clients that attempt to access the file that the file is in use. Until the first client releases the lock on the file, for advisory locking, no other client may obtain a lock (but may still manipulate the file), and for mandatory locking, prevents other clients from accessing the file. By obtaining a "read lock", one or more readers may safely access the same state of the file during an entire series of read operations, as writes from clients are denied, eliminating the potential of receiving a mix of new and old data.

Figure 3A:
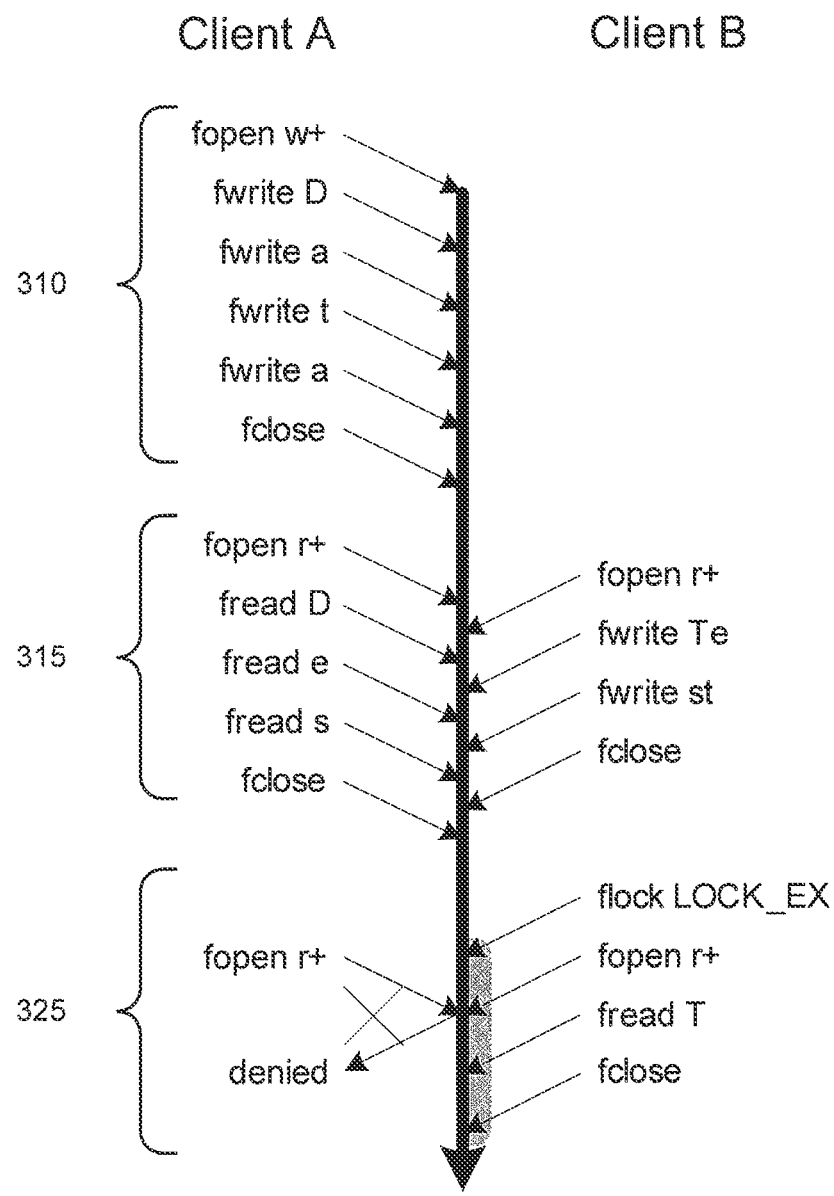
FIG. 3A shows an example of a series of file operations using file protocol performed against a file.

An example of a typical sequence of file protocol operations performed against a file is shown in FIG. 3A. In the figure, time runs downward along the vertical axis. In the first set of file interactions 310, Client A creates a new file, writes the contents "Data" in four separate write transactions, then closes the file.

In the second set of file interactions 315, Client A reads back the first three bytes of the file while simultaneously, Client B updates the file to write the contents "Test". Due to the overlapping write and read transactions, Client A receives some of the original file contents, "D", and some of the updated file contents, "es". The overlaps are dependent on the timing of the individual transactions, and thus can be unpredictable, often resulting in unexpected and incorrect program behavior and subsequent data corruption.

In the third set of file interactions 325, Client B claims a lock on the file. As a consequence of the lock, when Client A attempts to obtain a lock the file, an advisory notification is returned that an existing lock is present, informing Client A to not proceed to access the file. This represents the state of the art in the file world to allow non-coordinating actors to avoid the problems resulting from data corruption resulting from concurrent file accesses.

Object Protocol Semantics

Object clients use object protocol semantics to access and modify stored objects. Object clients typically use a stream-based programming model where the entire contents of an addressable object is written to or read from in a single store or retrieve operation (henceforth referred to as a PUT and GET operation, as per the embodiment in the HTTP protocol). Thus, PUT and GET operations are performed atomically based on the state of the stored object at the time the operation is performed, in contrast with file protocol's many individual write and read operations, which are performed non-atomically. Because of the atomic update nature of object protocol operations, clients will always see a consistent version of the object, and the "read while update" and "update while update" concurrency issues described above with files are not encountered, even when multiple readers and writers are accessing the same object.

In addition, this atomic nature of object protocols provides a foundation for maintaining different versions of objects as they are updated. As a consequence, object clients often expect that historical versions of an object will be retained and krill be accessible. This avoids the data loss that can result from multiple uncoordinated updates.

Figure 3B:
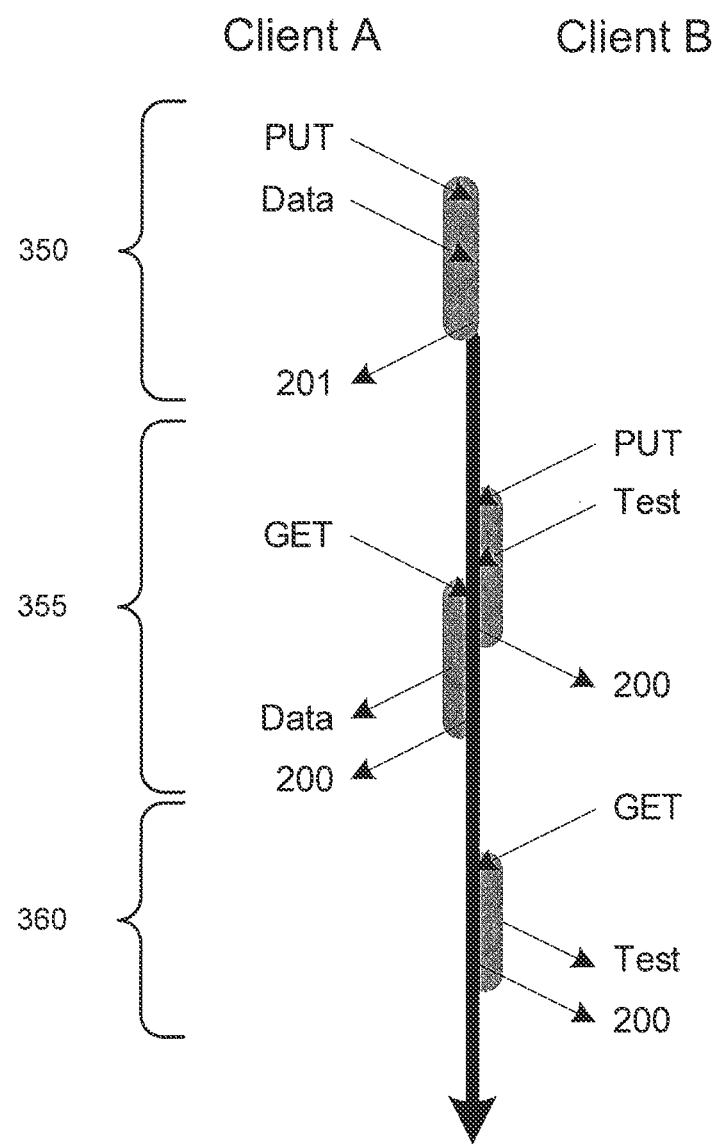
FIG. 3B shows an example of a series of object operations using object protocol performed against an object.

An example of a typical series of object operations using object protocol performed against an object is shown in FIG. 3B. In the figure, time runs downward along the vertical axis.

In the first set of object interactions 350, Client A performs a PUT operation to store the object value "Data" in a single atomic transaction. It is important to note that the object does not come into existence until the initial PUT transaction used to create the object is completed, and that this PUT transaction can be long-running. Any GET transactions attempting to read the object before the initial PUT transaction completes would return with a "does not exist" error message (henceforth referred to as a "404", or "404 Not Found" error, as per the typical embodiment in the HTTP protocol).

In the second set of object interactions 355, Client B starts a PUT to update the value of the object to "Test". While data is being sent to the server, Client A performs a GET to read the value of the object. Because the GET transaction was received before the PUT transaction completed, even though the GET transaction was received after the PUT transaction started, Client A receives the original value of the object, "Data". Only when the PUT transaction being performed by Client B completes does the state of the object change, and if the GET operation continues to return data to Client A after the PUT operation completes, the data received by Client A is still the data from the object state before the PUT operation completed. Specifically, GETs return the state of the object at the time the GET operation is started (regardless of how long the operation runs), and PUT operations only update the state of the object (visible only on subsequent GETs) at the time when the PUT operation completes.

In the third set of object interactions 360, Client B performs a GET to read the value of the object. Because the PUT transaction in the second set of interactions 355 has completed, Client B receives the updated value, "Test".

It is important to note that with object protocol semantics, Client A either receives "Data" or "Test", never a mixture of the two. As a consequence, one of the main requirements for locking no longer exists. As locking has significant implementation costs and restricts the development of distributed large-scale storage systems, object storage systems often omit locking functionality in order to enable other features that are incompatible with the concept of locking.

Apache Web Server—An Existing System Providing Limited File/Object Duality

A system that provides unified file and object protocol access is be able to bridge the differences described above between file protocol and object protocol worlds to enable both file clients and object clients to operate as expected. Moreover, the system ensures that interactions between file protocol and object protocol do not introduce undesired behaviors visible to the protocol clients or in the resulting stored or retrieved data.

An Apache web server is an example of an object protocol server that can be run on top of a standard file protocol file system. When this same file system is also shared via a file protocol server (such as NFS), such a system provides simultaneous file and object protocol access. The Apache server permits a client to use the HTTP object protocol to read any of the files in the file system that Apache has access to. However, one major disadvantage is that the Apache server is typically used only to provide read access to files via the HTTP object protocol. When object creates and updates are performed, they are performed as file update operations, and thus do not support lock-less atomicity, or provide support for different versions of the object data.

Another disadvantage with the Apache server is that the file system operates under file protocol, and the Apache server presents the files as objects via object protocol. As a result, if a file client updates a file, and an object client uses a GET operation to read the file at the same time as the file is being updated, the object client may receive a mixture of original file data and updated file data, the same problem found with file protocols, and a violation of the expected object protocol behaviors.

Thus, although the Apache server provides access to files via the HTTP object protocol, if a file is updated via a file protocol while simultaneously being read via an object protocol, the different protocols interact in a manner that results in the object client receive an unexpected result.

True File/Object Duality

In a unified storage system that enables both file clients that use file protocols and object clients that use object protocols to concurrently access and modify the stored data, both file semantics and object semantics are supported so that interactions between the different protocols upon the stored data do not introduce undesired or unexpected behaviors for either file clients or object clients. In addition, the following characteristics are implemented by the unified storage system: file-objects provide full file protocol semantics; the contents of a file-object accessed using an object protocol reflect the object state at the time the access was initiated; the contents of a file-object modified using an object protocol are based on the state of the object at the time the modification was initiated, and is only reflected in the state of the object at the time the modification completes; the state of the file-object accessible through a file protocol is updated to reflect the current state of the object; and file protocol file locking is honored for file protocol clients.

In order to implement the above characteristics, described below is a method where a file-object has a file representation that is modified by a client when using file protocol, and an object representation that includes one or more object states (versions) that are modified by a client when using object protocol. The file representation does not exhibit object behaviors, nor do the object representations exhibit file behaviors, but their contents are intertwined such that file updates are reflected as new object states, and object state updates are reflected in updates to the file representation that are indistinguishable from equivalent updates originating from other file clients.

Such a unified storage system supports bidirectional access of a file-object, that is, modifications made to the object using an object protocol can subsequently be accessed using a file protocol that operates on the file representation of the object. Similarly, modifications made to the file representation using a file protocol can subsequently be accessed using an object protocol that operates on the current object state (version). The bidirectional feature is implemented by copying or cloning the file representation to become a new object state after modification via a file protocol complete, and by copying or cloning the current object state to update the file representation after modification via an object protocol completes. In one embodiment, the process of copying a file includes, but is not limited to, basic copying, cloning, copy on write, and delayed copying. With basic copying, data is read from a first location and written to a second location. With cloning, instead of copying the data, reference counting is used to create a second location that refers to shared blocks that comprise the common data (a technique commonly used with deduplication). With copy on write, instead of writing the data to a second location, one or more pointers are created at the second location that points back to the first location. When a client writes to the second location, the pointer(s) are detached and replaced with the new data written to the second location, or when a client writes to the first location, the pointer(s) are detached such that the second location points to the original data, and the first location points to the newly written data. With delayed copying, pointers are created at the second location that point to the first location, and the data at the first location is gradually written over to the second location while simultaneously detaching the pointers, until there are no more pointers left. With delayed copying, any writes received to the first or second location are handled as described with copy on write.

The location of the file representation in the unified storage system is tracked and pointed to by a file namespace redirector maintained by a file namespace service (FNS), while the locations of the object representations (versions) are tracked and pointed to by object namespace redirectors maintained by an object namespace service (ONS).

Example of Creating a File-Object Via a File Protocol Request

Figure 4A:
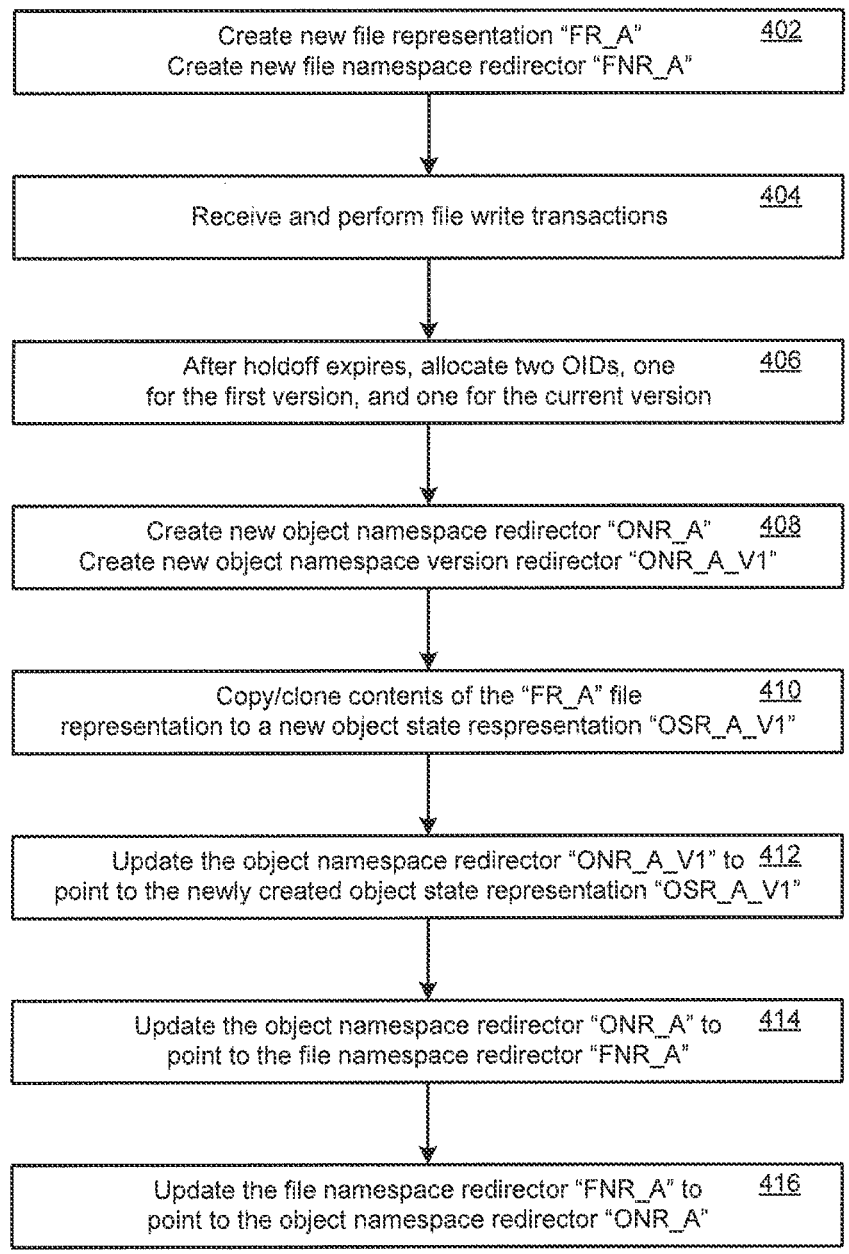
FIG. 4A shows an example process by which a new file-object is created upon receiving a file protocol request.
Figure 4B:
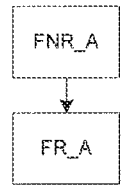
FIGS. 4B-4F show the relationships between the redirectors and the file and state representations.

FIG. 4A shows an example process by which a new file-object is created upon receiving a file protocol request. At block 402, the operating system 200 creates a new file representation and a new file namespace redirector that points to the new file representation. The file namespace redirector is a pointer that is used to map the directory entry for the file-object to the file representation of the file-object. The file representation is created at a data storage location that is selected based upon a create-time placement policy. In one example, the new file representation is given an identifier "FR_A", and the file namespace redirector is given an identifier "FNR_A". The relationship between "FNR_A" and "FR_A" is shown in FIG. 4B.

At block 404, the operating system 200 receives file write transactions over a file protocol from the user and performs the write transactions. The file writes are redirected by the file namespace redirector "FNR_A" to the file representation "FR_A", and are handled as typical file writes as would be used when using a traditional file system protocol, such as NFS or CIFS.

With file protocols, there is no definitive way to identify when any given client has stopped reading and/or writing through a file. Even with file protocols that can provide an explicit close to indicate that a client is finished with the file, sometimes the client immediately re-opens the file, writes, and then closes the file again, potentially thousands of times in rapid succession. Because it is difficult to determine when a file has finally been closed by a client, at block 406, the operating system 200 first waits until a holdoff period expires for the "FR_A" file. The holdoff period is reset each time the file is modified. After the system has waited for the holdoff period to expire and the file has remained unmodified during that time, the system allocates two object identifiers (OIDs). One of the OIDs is assigned to correspond to the first version of the object representation, while the other OID is assigned to correspond to the current version of the object representation. At this point in time, because the user is creating a new file-object, the first version is also the current version. However, separate OIDs are maintained because when the object is updated, the updated version becomes the current version, as will be seen below.

Figure 4C:
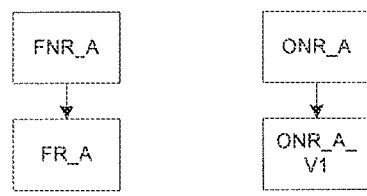

Then at block 408 two object namespace redirectors are created, one associated with each of the OIDs allocated in block 406. In the case of a file-object, the ONS maintains separate redirectors for each version of a file-object, with each of the versions of the object having been allocated a unique OID. In one example, the new object namespace redirectors are given the identifiers "ONR_A" for the current version, and "ONR_A_V1" for the first version, which is pointed to by the current version object namespace redirector "ONR_A". The number of historical versions retained can be determined by a policy associated with the file-object, and at creation time there only exists a single version. The relationship between "ONR_A" and "ONR_A_V1" is shown in FIG. 4C.

Figure 4D:
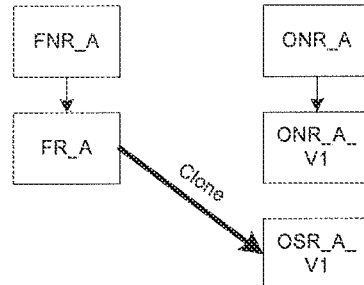

Then at block 410 the contents of the "FR_A" file representation is cloned to a new object state representation located at a data storage location that is selected based upon a create-time placement policy. This data storage location could be the same location as the "FR_A" file representation is stored, or may be a different storage location. In one example, the new object state representation is given an identifier "OSR_A_V1". The clone operation to the newly created object state representation is shown in FIG. 4D. In one embodiment, file cloning is performed by the Write Anywhere File Layout (WAFL®) file system which has the capability of making a clone of a file very quickly without duplicating the data on disk until it is modified. Thus, the new cloned file does not take up additional storage space. Only when data is either written to the file being cloned or to the resulting cloned file does the cloned file start to take up more storage space, and only to the extent of the extra data that is written to the file. In one embodiment, other methods of copying or cloning files can be used, where the latencies that a client encounters is minimal, an example of which is the WAFL file system's capability of performing a single file migrate on demand (SFMoD) which essentially migrates the contents of a file from one location to another transparently in the background.

Figure 4E:
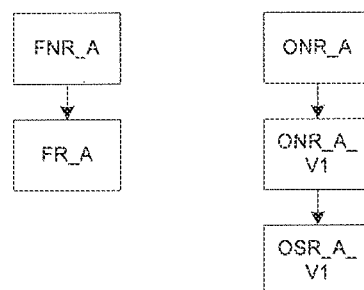

At block 412 the "ONR_A_V1" redirector is updated to point to the newly cloned "OSR_A_V1" object state representation. The resulting relationship between "ONR_A_V1" object namespace redirector and the "OSR_A_V1" object state representation is shown in FIG. 4E. When the "FR_A" file is modified, the above process will be repeated, with differences to create a new version of the existing object instead of creating a new object, as will be described below.

Figure 4F:
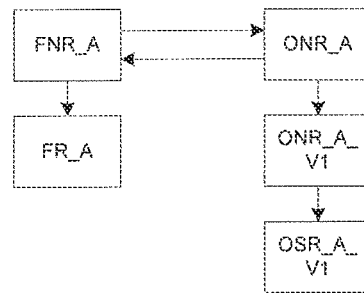

Next, at block 414 the current version object namespace redirector "ONR_A" is updated to point to the originating file namespace redirector "FNR_A". This enables updates to the object to trigger corresponding updates to the file representation. Finally, at block 416, the originating file namespace redirector "FNR_A" is updated to point to the corresponding object namespace redirector "ONR_A". This enables subsequent updates to the file representation to trigger the creation of new versions of the corresponding object representation. The resulting relationship between "ONR_A" object namespace redirector and the "FNR_A" file namespace redirector is shown in FIG. 4F.

Alternatively, blocks 406 and 408 may be performed after block 410 if it is desired that the object not be visible in the Object Namespace until such time as the object is completely copied or cloned.

Example of Modifying a File-Object Via a File Protocol Request

Figure 5A:
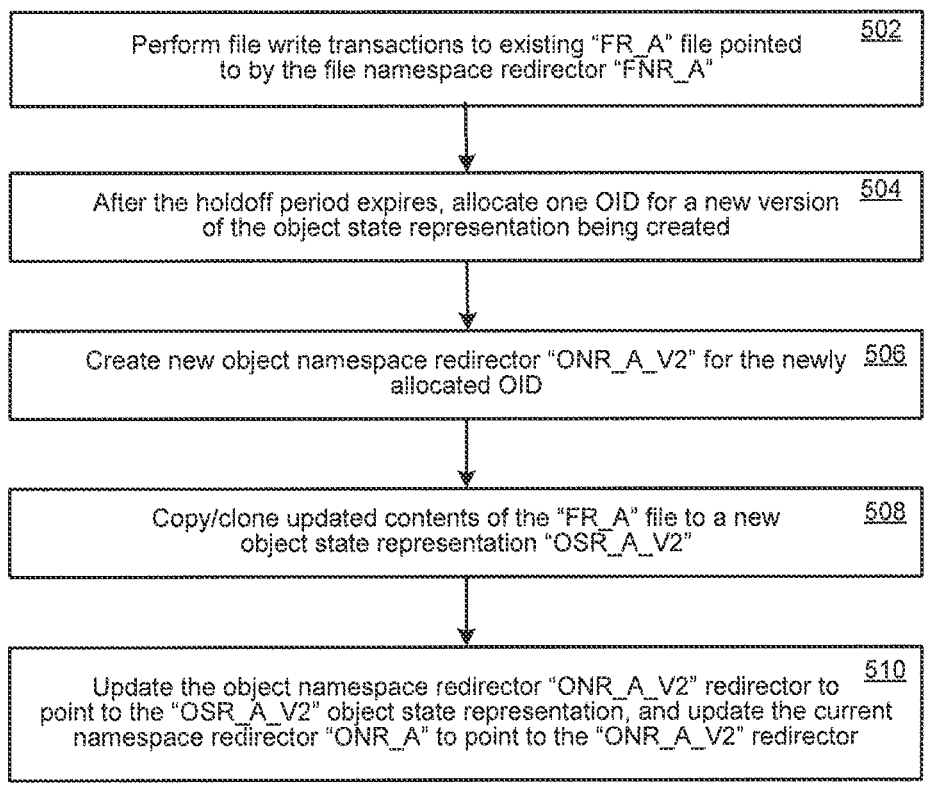
FIG. 5A shows an example process by which an existing file-object is updated upon receiving a file protocol request.
Figure 5B:
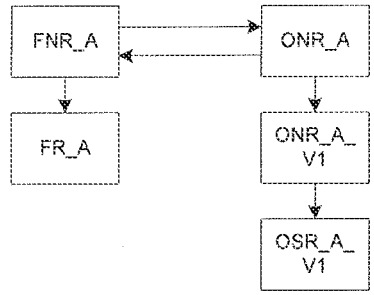
FIGS. 5B-5E show the relationships between the redirectors and the file and state representations.

FIG. 5A shows an example process by which an existing file-object is updated upon receiving a file protocol request. In one example, the existing file-object has a file namespace redirector "FNR_A" pointing to a file representation of the file-object with the identifier "FR_A". Further, two ONS redirectors are both pointing to an existing object state representation, "OSR_A_V1", i.e. the first version object state representation is the current version object state representation. The relationships between the redirectors and the file and object state representations are shown in FIG. 5B.

At block 502, the system performs file write transactions received from the user. The file writes are redirected by the file namespace redirector "FNR_A" to the file representation "FR_A", and are handled as typical file writes as would be used when using a traditional file system protocol, such as NFS or CIFS. At this point, the file representation is now considered "dirty" and is no longer in sync with the object representation.

Figure 5C:
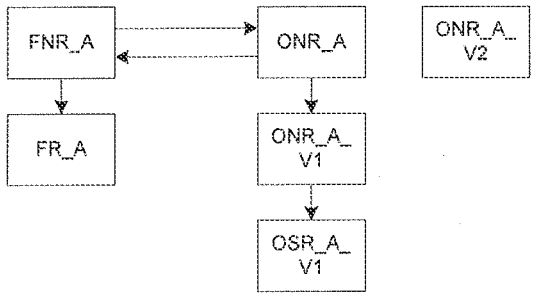

At block 504, the operating system 200 waits until a holdoff period expires for the "FR_A" file to be sure that the client has finished updating the file. Then the system allocates one new OID for a new version of the object state representation that will be created for the file-object. Then at block 506, this ONS redirector, given the identifier "ONR_A_V2" is created for the newly allocated OID. The relationships between the redirectors and the file and state representations are shown in FIG. 5C.

Figure 5D:
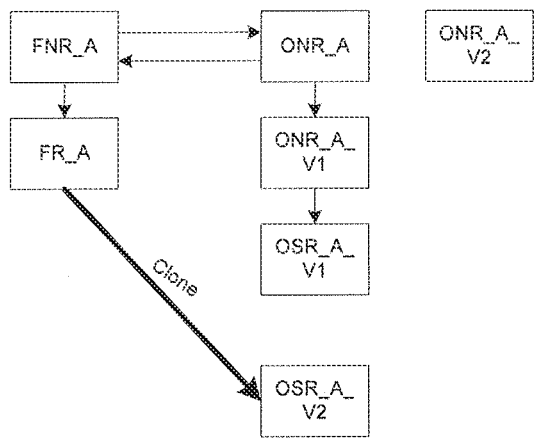

At block 508, the contents of the "FR_A" The representation is cloned to a new object state representation located at a data storage location that is selected based upon a create-time placement policy. This data storage location could be the same location as where the "FR_A" file representation is stored, could be the same location as where the "OSR_A_V1" object state representation is stored, or may be a different storage location. In one example, the new object state representation is given an identifier "OSR_A_V2". The clone operation to the newly created object state representation is shown in FIG. 5D.

Figure 5E:
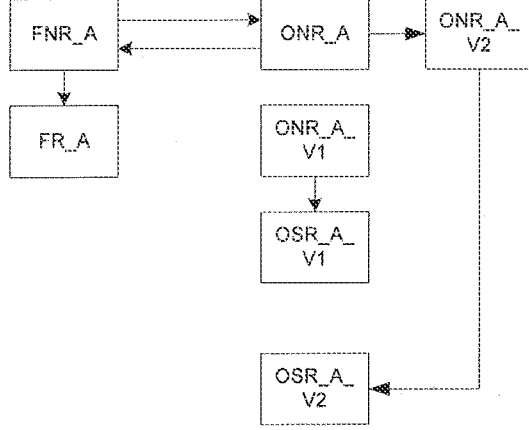

Then at block 510 the new ONS redirector "ONR_A_V2" is updated to point to the newly created "OSR_A_V2" file, and the current version ONS redirector is updated to point to the newly created "ONR_A_V2" redirector. In this example, "OSR_A_V1" is the first version of the object state representation, and the "OSR_A_V2" is the second version of the object file. Thus, the first version ONS redirector "ONR_A_V1" (created at block 408 and updated at block 412) points to the "OSR_A_V1" file, and the second version ONS redirector "ONR_A_V2" (created at block 506 and updated at block 510) points to the "OSR_A_V2" object state representation. The current version ONS redirector "ONR_A" (created at block 408 and updated at block 510) originally pointed to the first version ONS redirector "ONR_A_V1", and now points to the second version "ONR_A_V2". Subsequent retrievals or modifications of the object state representation via object protocol will modify the "OSR_A_V2" file, as described later. At this point, the file representation is no longer considered "dirty", as the file and object representations are in sync. The relationships between the redirectors and the file and state representations are shown in FIG. 5E.

When a new version of an object state representation is created, if the version policy indicates that only a certain number of versions are to be retained, (based on factors such as version count, version age, version storage consumption, etc) if so indicated by the policy, the oldest object state representation version or versions may be deleted.

Example of Deleting a File-Object Via a File Protocol Request

Figure 6A:
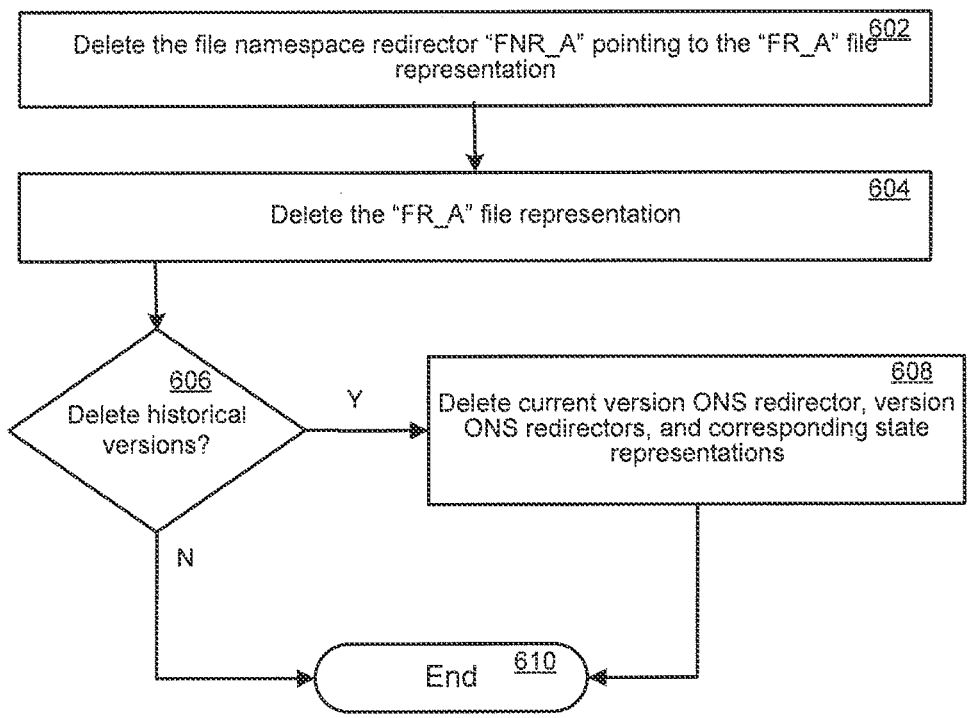
FIG. 6A shows an example process by which an existing file-object is deleted upon receiving a file protocol request.
Figure 6B:
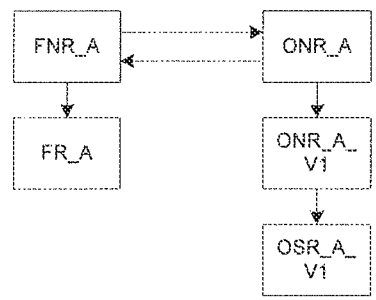
FIGS. 6B and 6C show the relationships between the redirectors and the the and state representations.
Figure 6C:
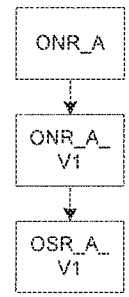

FIG. 6A shows an example process by which an existing file-object is deleted upon receiving a file protocol request. In one example, the existing file-object has a file namespace redirector "FNR_A" pointing to a file representation of the file-object with the identifier "FR_A". Further, two ONS redirectors are both pointing to a newly created object state representation, "OSR_A_V1", i.e. the first version object state representation is the current version object state representation. The relationships between the redirectors and the file and state representations are shown in FIG. 6C.

At block 602, the system deletes the file namespace redirector "FNR_A" pointing to the "FR_A" file representation. Then at block 604 the "FR_A" file representation is deleted from its storage location. The relationships between the redirectors and the state representation are shown in FIG. 6C.

At decision block 606, the system determines if the current and historical versions of the object state representation are to be deleted as specified by the appropriate policy associated with the data object. If historical versions of the object state representation are not to be deleted (block 606—No), the process ends at block 610. If historical versions of the object state representation are to be deleted (block 606—Yes), at block 608 the current version ONS redirector, the version ONS redirectors, and their corresponding object state representations are deleted. The process ends at block 610.

Figure 7A:
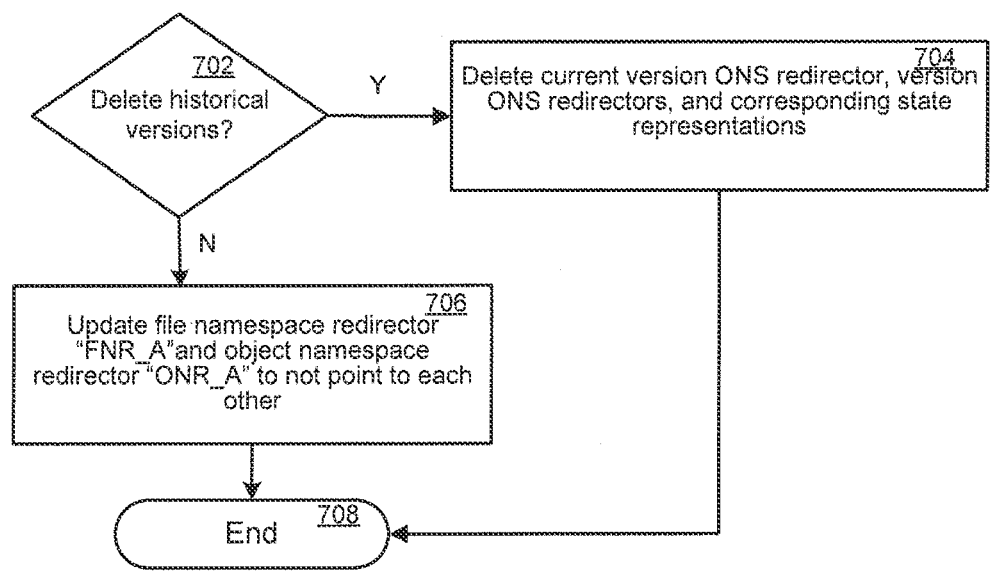
FIG. 7A shows an example process by which an existing file-object is converted into a file representation upon receiving a file or object protocol request.
Figure 7B:
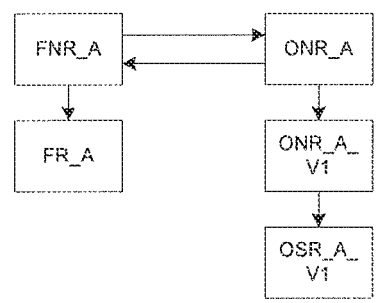
FIGS. 7B-7D show the relationships between the redirectors and the file and state representations.

Example of Converting a File-Object to a File Representation or Splitting a File-Object into a Separate File Representation and Object Representation FIG. 7A shows an example process by which an existing file-object is converted into a file representation or split into a separate file representation and object representation upon receiving a file or object protocol request. In one example, the existing file-object has a file namespace redirector "FNR_A" pointing to a file representation of the file-object with the identifier "FR_A". Further, two ONS redirectors are both pointing to a newly created object state representation, "OSR_A_V1", i.e. the first version object state representation is the current version object state representation. The relationships between the redirectors and the file and state representations are shown in FIG. 7B.

Figure 7C:
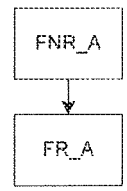
Figure 7D:
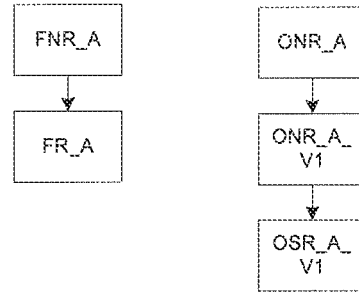

At decision block 702, the system determines if the current and historical versions of the object state representations are to be deleted as specified by the appropriate policy associated with the data object (converting to a file representation). If the current and historical versions of the object state representations are not to be deleted (block 702—No), at block 706 the file namespace redirector "FNR_A" and object namespace redirector "ONR_A" are updated to not point to each other (splitting into decoupled file representation and object representation). One reason to decouple the file representation from the object state representation(s) is to allow clients to continue to access both and yet allow the file representation to deviate from the object state representation(s). The process ends at block 708. The relationships between the redirectors and the file and state representations are shown in FIG. 7D.

If the current and historical versions of the object state representations are to be deleted (block 702—Yes), at block 704 the current version ONS redirector, the version ONS redirectors and their corresponding version object state representations are deleted. Thus, all object state representations and related ONS redirectors are deleted, leaving only the file representation of the file-object. The process ends at block 708. The relationship between the file redirector and the file representation is shown in FIG. 7C.

Figure 8A:
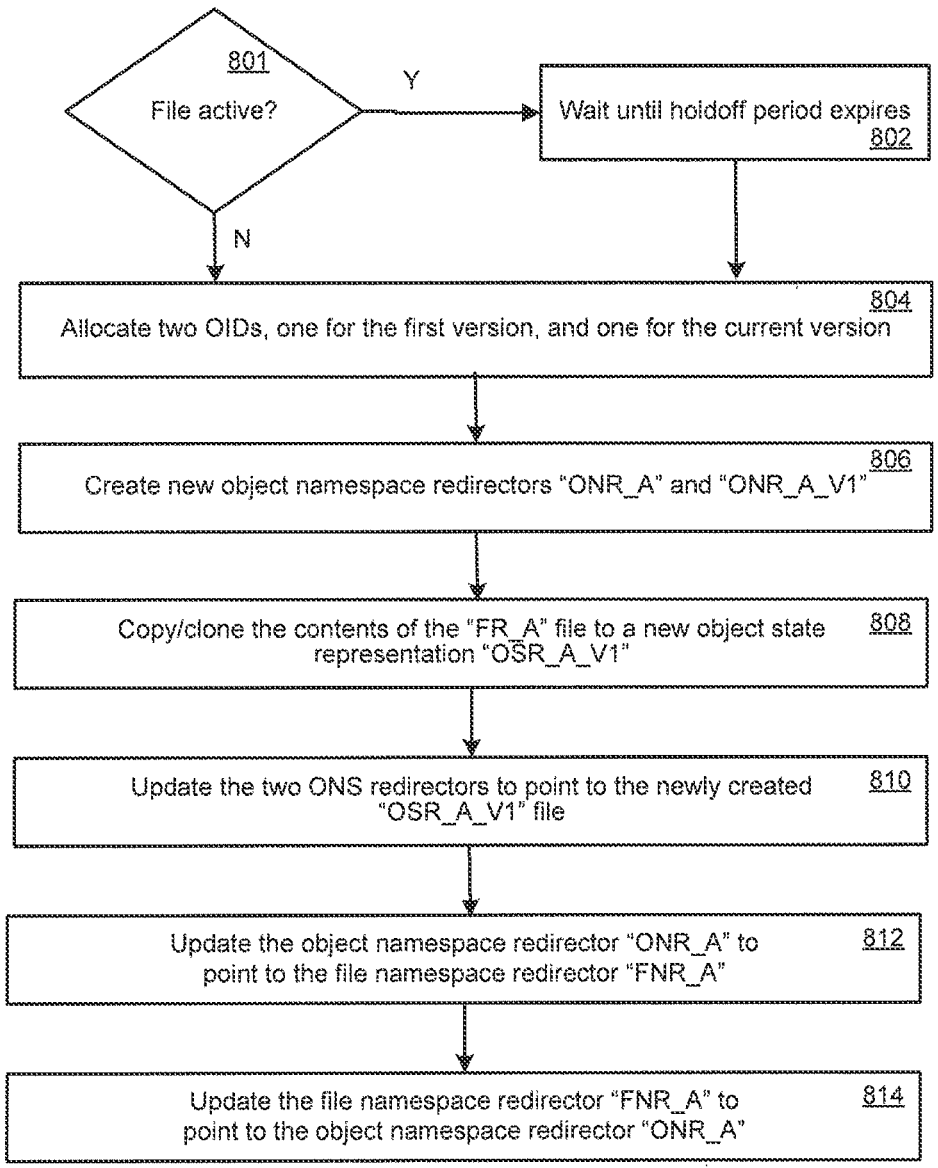
FIG. 8A shows an example process by which a file representation is converted into a file-object upon receiving a file or object protocol request.
Figure 8B:
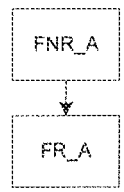
FIGS. 8B-8E show the relationships between the redirectors and the file and state representations.

Example of Converting a File Representation into a File-Object Via a File or Object Protocol Request FIG. 8A shows an example process by which a file representation is converted into a file-object upon receiving a file or object protocol request. In one example, the file representation to be converted has the identifier "FR_A" and a file namespace redirector "FNR_A" points to file representation "FR_A". There are no ONS redirectors because there are no associated object state representations yet. The relationship between the file redirector and the file representation is shown in FIG. 8B.

At decision block 801, the system determines if the file representation to be converted is active. If the file is active (block 801—Yes), at block 802 the system waits until a hold-off period expires to be sure that the client has finished accessing the file. Then at block 804 two object identifiers (OID) are allocated. One of the OIDs is assigned to the first version of an object state representation, while the other OID is assigned to the current version of the object state representation.

At block 806 two ONS redirectors are created, one for each of the OIDs allocated at block 804. In one example, the new object namespace redirectors are given the identifiers "ONR_A" for the current version, and "ONR_A_V1" for the first version, which is pointed to by the current version object namespace redirector "ONR_A".

Figure 8C:
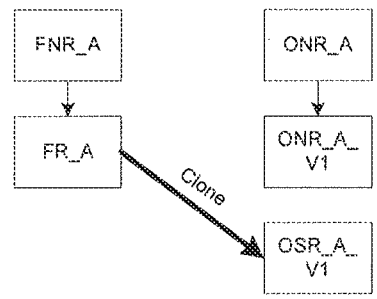
Figure 8D:
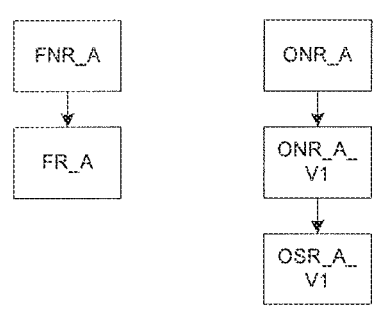

Next, at block 808 the contents of the "FR_A" file is cloned to a new object state representation. In one example, the new object state representation is given an identifier "OSR_A_V1". The clone operation to the newly created object state representation is shown in FIG. 8C. Then at block 810 the two ONS redirectors are updated to point to the newly created "OSR_A_V1" object state representation. The relationships between the redirectors and the file and state representations are shown in FIG. 8D.

Figure 8E:
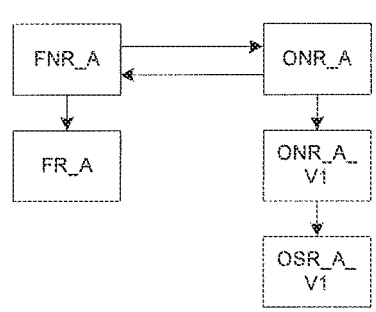

Then at block 812 the current version object namespace redirector "ONR_A" is updated to point to the originating file namespace redirector "FNR_A". This enables updates to the object to trigger corresponding updates to the file representation. Finally, at block 814, the originating file namespace redirector "FNR_A" is updated to point to the corresponding object namespace redirector "ONR_A". This enables subsequent updates to the file representation to trigger the creation of new versions of the corresponding object representation. The resulting relationship between "ONR_A" object namespace redirector and the "FNR_A" file namespace redirector is shown in FIG. 8E.

Returning to the decision block 801, if the file representation is not active (block 801—No), the process continues to block 804 as described above.

Example of Creating a File-Object Via an Object Protocol Request

Figure 9A:
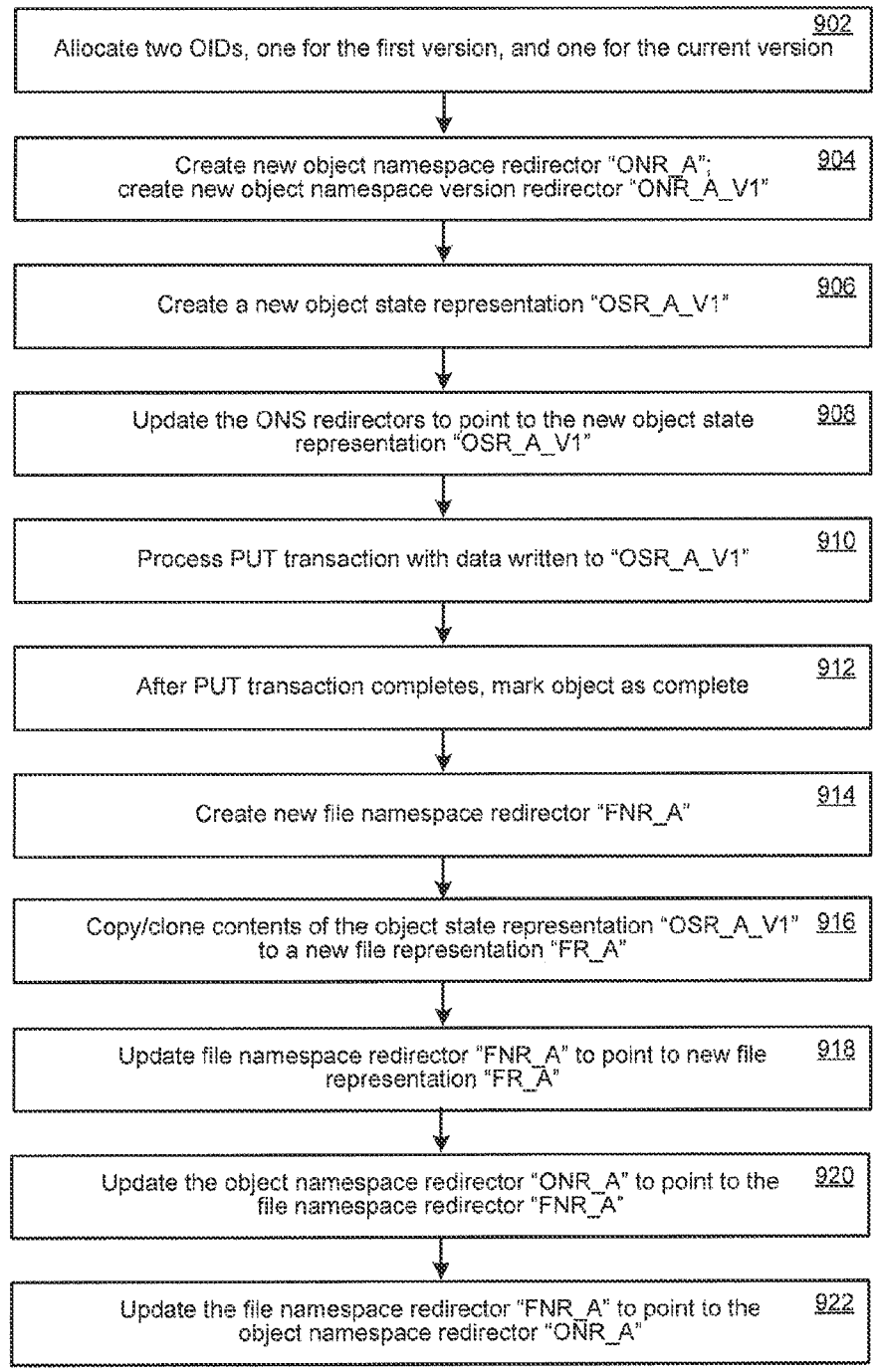
FIG. 9A shows an example process by which a new file-object is created upon receiving an object protocol request.
Figure 9B:
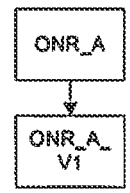
FIGS. 9B-9E show the relationships between the redirectors and the file and state representations.

FIG. 9A shows an example process by which a new file-object is created upon receiving an object protocol request. At block 902, two object identifiers (OID) are allocated. One of the OIDs is assigned to the first version of an object state representation, while the other OID is assigned to the current version of the object state representation. Then at block 904 two ONS redirectors are created, one for each of the OIDs allocated in block 902. In one example, the new object namespace redirectors are given the identifiers "ONR_A" for the current version and "ONR_A_V1" for the first version which is pointed to by the current version object namespace redirector "ONR_A". The relationship between "ONR_A" and "ONR_A_V1" is shown in FIG. 9B.

Figure 9C:
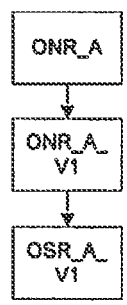

At block 906 a new object state representation is created at a data storage location that is selected based upon a create-time placement policy. In one example, the new object state representation is given an identifier "OSR_A_V1" Then at block 908 the ONS redirectors are updated to point to the new object state representation "OSR_A_V1" The resulting relationship between object namespace redirectors "ONR_A" and "ONR_A_V1" and the object state representation "OSR_A_V1" is shown in FIG. 9C.

Next, at block 910 the object PUT transaction is processed, and the data is written to the "OSR_A_V1" state representation. At block 912, the object state representation is marked as complete after the put transaction is complete. No holdoff is required, as object protocols provide a clear indication of when the transaction completes.

Figure 9D:
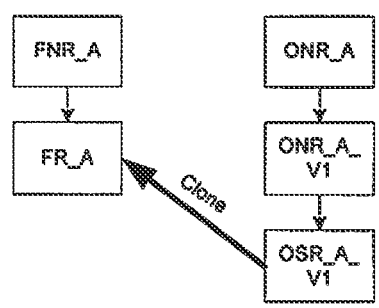

Once the object state representation and the associated redirectors and OIDs have been established, the file representation of the object state representation is created. At block 914, a new file namespace redirector with the identifier "FNR_A" is created, and at block 916 the contents of the "OSR_A_V1" state representation is copied or cloned to this new file representation. At block 918, the file namespace redirector is updated to point to the new "FR_A" file. The relationships between the redirectors and the file and state representations are shown in FIG. 9D.

Figure 9E:
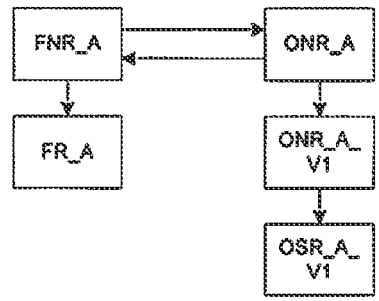

After the copy has completed or once the clone has started, at block 920 the current version object namespace redirector "ONR_A" is updated to point to the file namespace redirector "FNR_A". This enables updates to the object to trigger corresponding updates to the file representation. Finally, at block 922, the file namespace redirector "FNR_A" is updated to point to the corresponding object namespace redirector "ONR_A". This enables subsequent updates to the file representation to trigger the creation of new versions of the corresponding object representation. The resulting relationship between "ONR_A" object namespace redirector and the "FNR_A" file namespace redirector is shown in FIG. 9E.

Alternatively, the "FNR_A" file namespace redirector can be created after the "FR_A" file representation has been created and either the copy has completed or the clone has started.

Example of Modifying a File-Object Via an Object Protocol Request

Figure 10A:
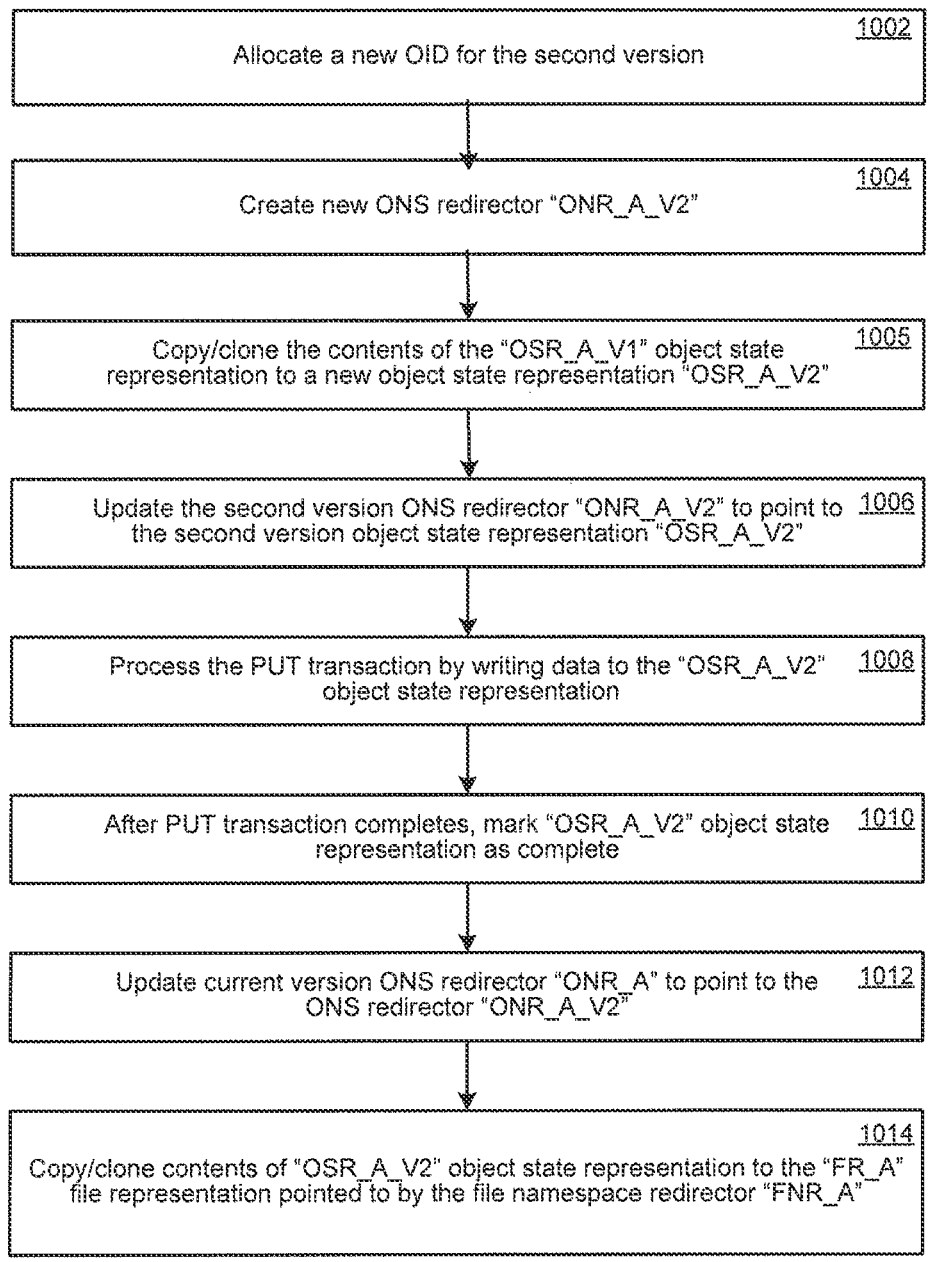
FIG. 10A shows an example process by which an existing file-object is updated upon receiving an object protocol request.
Figure 10B:
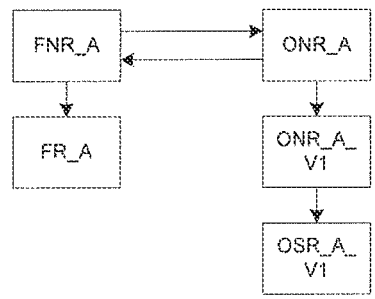
FIGS. 10B-10E show the relationships between the redirectors and the file and state representations.

FIG. 10A shows an example process by which an existing file-object is updated upon receiving an object protocol request. In one example, the existing file-object has a file namespace redirector "FNR_A" pointing to a file representation of the file-object with the identifier "FR_A". Further, two ONS redirectors, "ONR_A" and "ONR_A_V1" are both pointing to a newly created object state representation, "OSR_A_V1", i.e. the first version object state representation is the current version object state representation. The relationships between the redirectors and the file and state representations are shown in FIG. 10B.

At block 1002 a new OID is allocated for the second version object state representation. Then at block 1004 a new ONS redirector, "ONR_A_V2", is created for the second version object state representation.

Figure 10C:
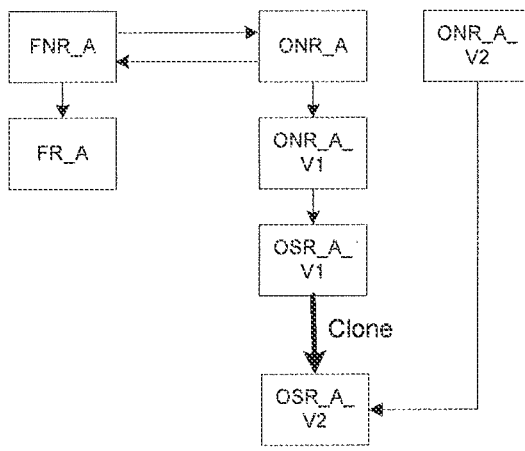

Next, at block 1005, the contents of the "OSR_A_V1" object state representation is copied or cloned to a second version object state representation. In one example, the second version object state representation is given an identifier "OSR_A_V2". Then at block 1006, the second version ONS redirector "ONR_A_V2" is updated to point to the second version object state representation "OSR_A_V2". The relationships between the redirectors and the file and state representations are shown in FIG. 10C.

Figure 10D:
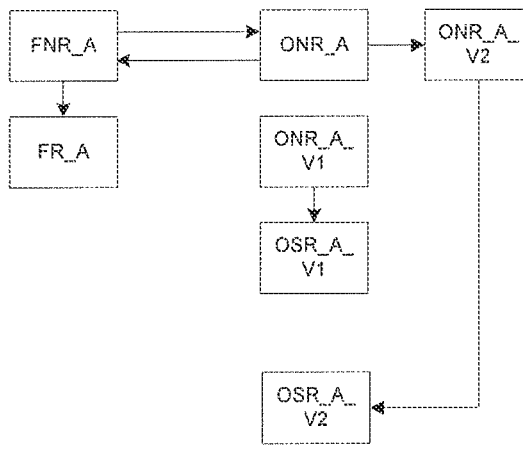

At block 1008 the object PUT transaction is processed, and the data is written to the second version object state representation, "OSR_A_V2". At block 1010, the object state representation "OSR_A_V2" is marked as complete after the put transaction is complete. Then at block 1012, the current version ONS redirector "ONR_A" is updated to point to the second version object namespace redirector "ONR_A_V2". The relationships between the redirectors and the file and state representations are shown in FIG. 10D.

Figure 10E:
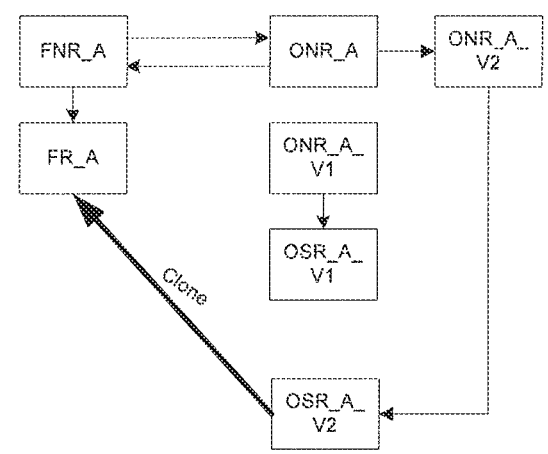

After the updates to the object state representation "OSR_A_V2" are complete, the file representation "FR_A" of the object state representation is updated. At block 1014, the contents of the second version object stare representation, "OSR_A_V2", is copied or cloned to the "FR_A" file representation which is pointed to by the file namespace redirector "FNR_A". In one embodiment, if the file namespace redirector "FNR_A" for the file representation has a lock that prevents multiple concurrent readers and/or writers, cloning of the contents of the object state representation "OSR_A_V2" is deferred until the lock is released. The relationships between the redirectors and the file and state representations are shown in FIG. 10E.

Example of Deleting a File-Object Via an Object Protocol Request

Figure 11A:
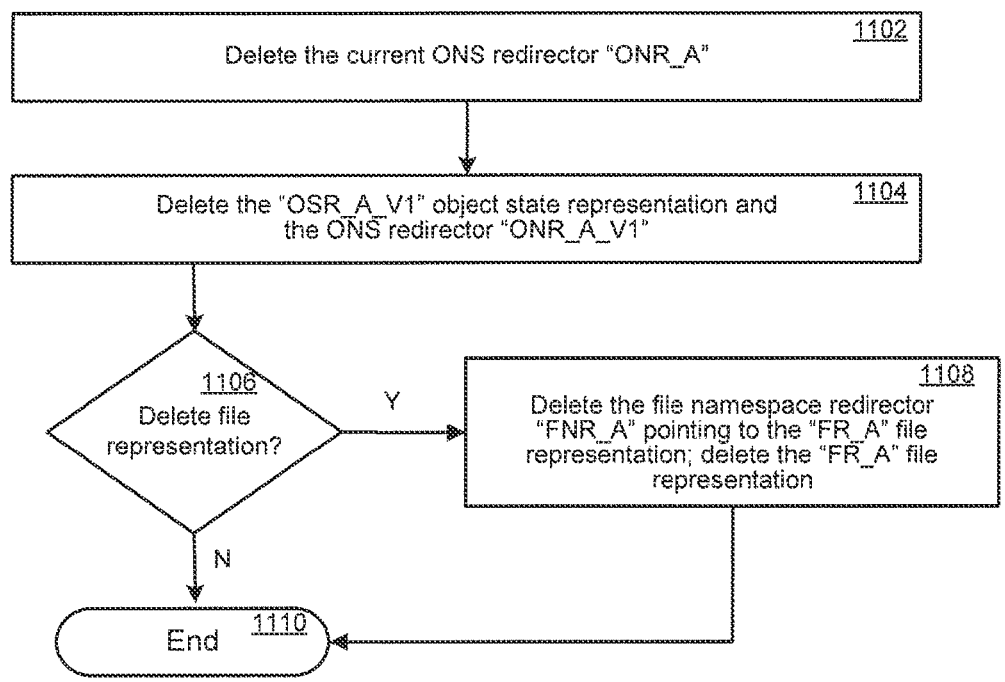
FIG. 11A shows an example process by which an existing file-object is deleted upon receiving an object protocol request.
Figure 11B:
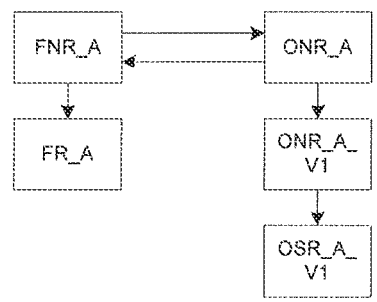
FIGS. 11B and 11C show the relationships between the redirectors and the file and state representations.

FIG. 11A shows an example process by which an existing file-object is deleted upon receiving an object protocol request. In one example, the existing file-object has a file namespace redirector "FNR_A" pointing to a file representation of the file-object with the identifier "FR_A". Further, two ONS redirectors are both pointing to a newly created object state representation, "OSR_A_V1" i.e. the first version object state representation is the current version object state representation. The relationships between the redirectors and the file and state representations are shown in FIG. 11B.

At block 1102 the ONS redirector "ONR_A" for the current version of the object state representation is deleted, and the pointer from "FNR_A" to "ONR_A" is removed from "FR_A". Then at block 1104 the object state representation "OSR_A_V1" and the version ONS redirector "ONR_A_V1" that points to the object state representation "OSR_A_V1" are deleted. This would be repeated for all historical versions. The relationships between the redirectors and the state representation are shown in FIG. 11C.

Next, at decision block 1106, the system determines if the file representation corresponding to the file-object is to be deleted as specified, based on the policy associated with the data object. If the file representation is to be deleted (block 1106—Yes), at block 1108 the file namespace redirector "FNR_A" pointing to the "FR_A" file representation is deleted, and the FR_A" file representation that the file namespace redirector "FNR_A" points to is deleted. In one embodiment, if the file namespace redirector "FNR_A" has a lock that prevents multiple concurrent readers and/or writers, an error is returned to the object client. Alternatively, deleting of the contents of the "FR_A" file is deferred until the lock is released.

Figure 11C:
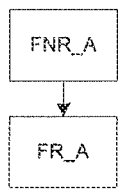

Returning to decision block 1106, if the file representation is not to be deleted (block 1106—No), then no more processing is performed and the state remains as shown in FIG. 11C.

Examples of Combinations of Operations

Figure 12:
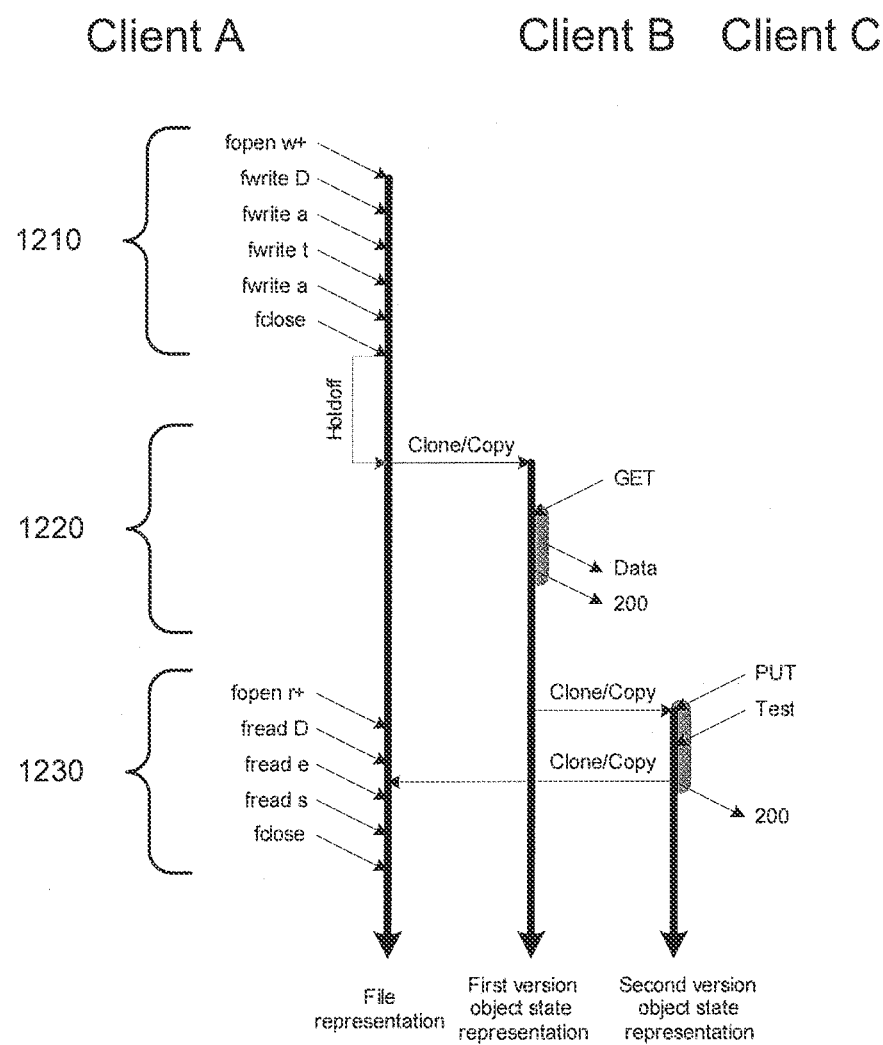
FIG. 12 shows an example of a series of file and object operations using file protocol performed against a standard file representation and object protocol performed against an object representation.

FIG. 12 shows an example of a series of file and object operations using a file protocol performed against the file representation and using an object protocol performed against the object state representation. In the figure, time runs downward along the vertical axis. The leftmost vertical line shows operations performed against the file representation of the file-object, the middle vertical line shows operations performed against a first version of the object state representation of the file-object, and the rightmost vertical line shows operations performed against a second version of the object state representation of the file-object.

In the set of file representation interactions 1210, client A creates a new file representation, writes the contents "Data" in four separate write transactions to the file representation, and then closes the file representation. After a holdoff period, the system copies/clones the file representation to a first version of the object state representation.

Then in the set of object state representation interactions 1220, Client B accesses the first version object state representation to obtain the contents "Data" from the object state representation.

Next, in the set of file representation and object state representation interactions 1230, Client C updates the object state representation using object protocol with a PUT transaction. Prior to allowing the PUT transaction to take place, the first version object state representation is copied/cloned to a second version object state representation. Then Client C writes "Test" to the second (and current) version object state representation. While Client C is updating the object state representation, Client A starts to read the file representation of the file-object using file protocol and obtains the contents "D" while Client C is writing "Test" to the object state representation. After the PUT transaction is completed, the second version object state representation that was just updated by Client C is copied/cloned to the file representation of the file-object. Because the copying/cloning process occurs almost instantly, the file version that Client A is reading from now contains "Test", so as Client A completes its reading of the file representation, it obtains "es" and then closes the file representation. This is equivalent to the scenario where Client C and Client A are both file protocol clients, and thus is not unexpected behavior for Client A.

The example of FIG. 12 shows that the file-object exhibits the behavior expected by file client A and object clients B and C. Client A reads the data in the file representation in a series of atomic reads. If the file representation of the file-object is written to while Client A is reading the data, Client A expects to receive a mix of data from prior to the time the file is written to and from after the file has been written to. When Client B reads the first version of the object state representation, the contents of the object state representation reflect the data written by Client A to the file representation. Client C updates the object state representation while Client A is reading the file representation so Client A receives a mix of the original data that Client A stored and the rest of the updates that Client C stored.

In summary, there are two rules for implementing file-objects. The first rule applies when an update using file protocol is made to a file representation of a file-object. In this situation, after the updated file representation has been closed, the system waits a minimum duration, the holdoff period, before cloning the updated file representation to create a new object state representation.

The second rule applies when an update using object protocol is made to an object state representation of a file-object. In this situation, a new version of the object state representation is first cloned from the current version of the object state representation. Then the PUT transactions are written to the new version of the object state representation. Finally, the modified new version of the object state representation is copied/cloned over to the file representation of the file-object. If the file representation is locked, copying/cloning of the object state representation waits until the lock is released.

Figure 13:
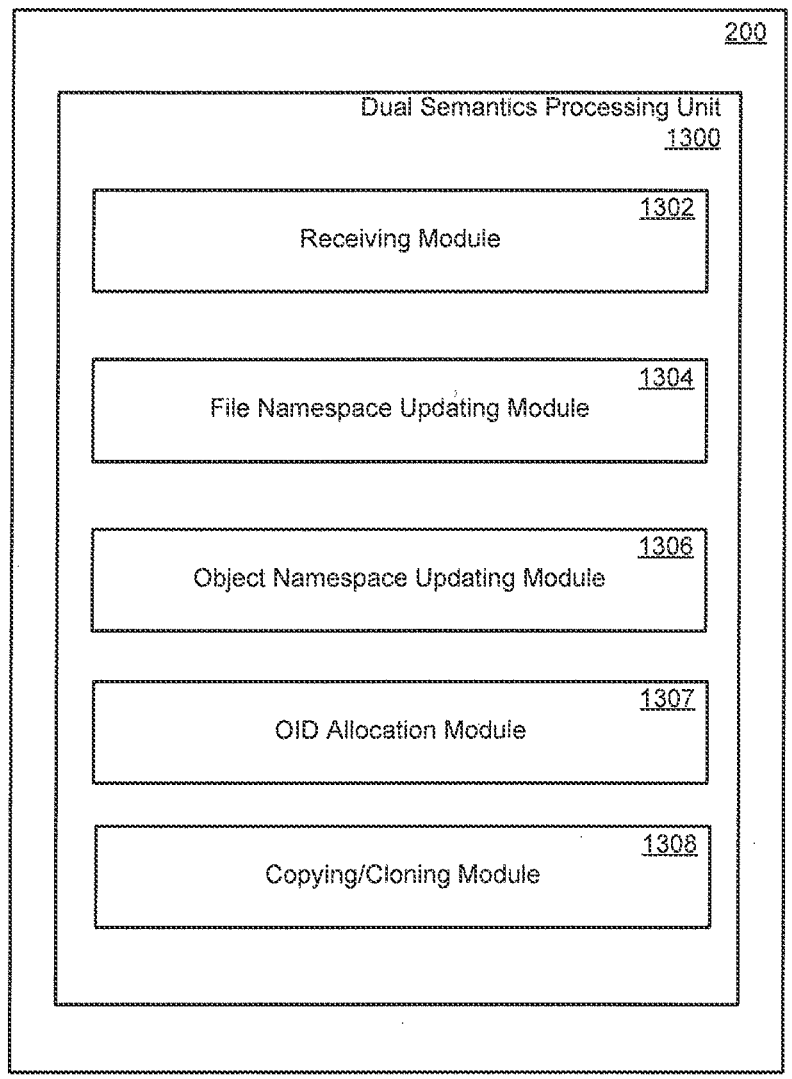
FIG. 13 is an exemplary architecture of an operating system configured to create or manipulate a file-object in response to a request from a client using either file protocol or object protocol.

FIG. 13 is an example of an architecture of the operating system 200 configured, for example, to create or manipulate a file-object in response to a request from the client 104 using either file protocol or object protocol. In the example of FIG. 13, the operating system 200 includes a dual semantics processing unit 1300 that performs various functions to respond to the client's request. In some instances, the dual semantics processing unit 1300 is implemented by using programmable circuitry programmed by software and/or firmware, or by using special-purpose hardwired circuitry, or by using a combination of such embodiments.

In the example of FIG. 13, the dual semantics processing unit 1300 includes a receiving module 1302, a file namespace updating module 1304, an object namespace updating module 1306, an OID allocation module 1307, and a copying/cloning module 1308. The receiving module 1302 is configured to receive a request to create or manipulate a file-object from the client 104, where the request uses either file protocol or object protocol. An OID allocation module 1307 allocates object identifiers to each version of object state representation. The OID allocation module 1307 sends the current version OIDs to a file namespace updating module 1304 and an object namespace updating module 1306. The file namespace updating module 1304 of the dual semantics processing unit 1300 creates file namespace redirectors that point to the appropriate file representations of the file-objects and adds current version OIDs to the file namespace redirectors. An object namespace updating module 1306 creates ONS redirectors associated with the OIDs for each version of object state representation, and the ONS redirectors point to the appropriate versions of the object state representations. A copying/cloning module 1308 copies/clones files from a file representation to an object state representation or vice versa.

Figure 14:
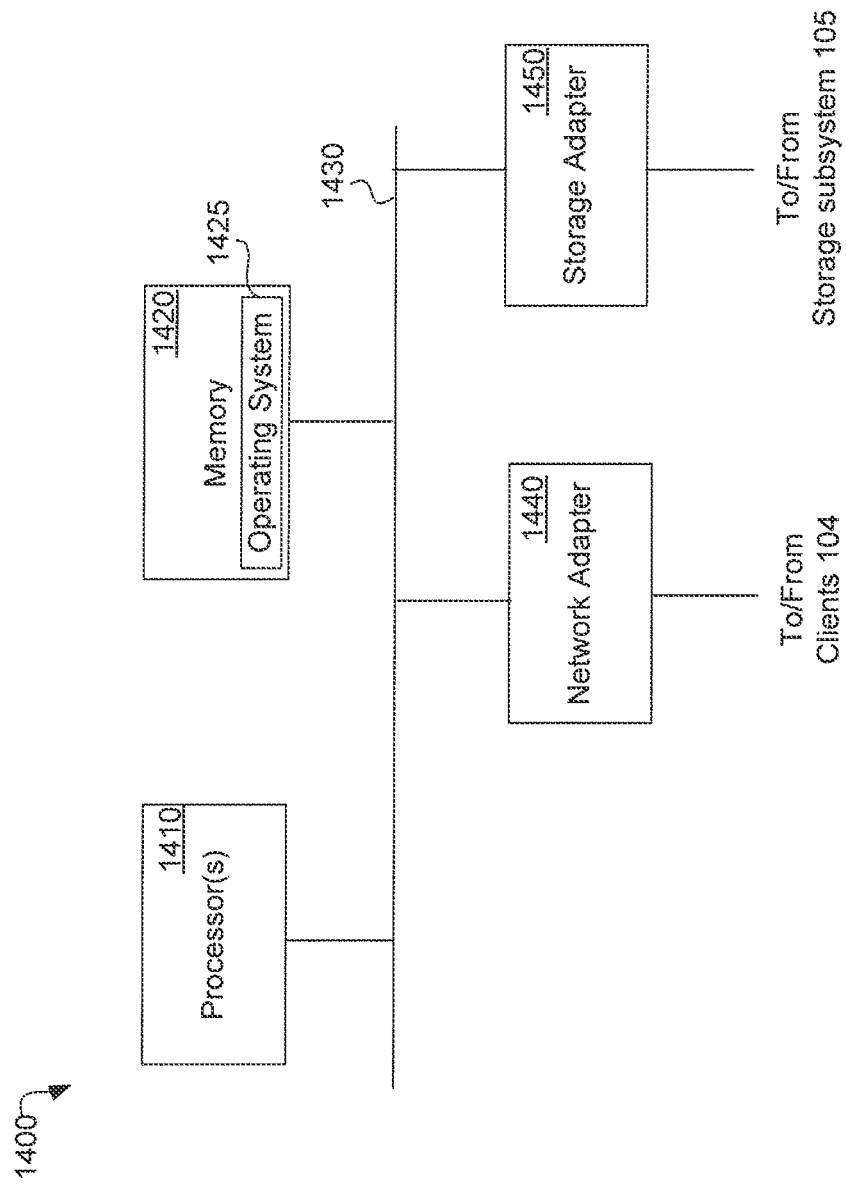
FIG. 14 is a block diagram showing an example of the architecture for a processing system that can be utilized to implement the unified storage system.

FIG. 14 is a high-level block diagram showing an example of the architecture of a storage server 108 that can be utilized to implement the techniques described herein. The storage server 108 includes one or more processors 1410 and memory 1420 coupled to an interconnect 1430. The interconnect 1430 shown in FIG. 14 is an abstraction that represents any one or more separate physical buses, point-to-point connections, or both connected by appropriate bridges, adapters, or controllers. The interconnect 1430, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 1410 may include central processing units (CPUs) of the storage server 108 and, thus, control the overall operation of the storage server 108. In certain embodiments, the processor(s) 1410 accomplish this by executing software or firmware stored in memory 1420. The processor(s) 1410 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1420 is or includes the main memory of the storage server 108. The memory 1420 represents any form of random access memory (RAM), read-only memory (ROM), flash memory (as discussed above), or the like, or a combination of such devices. In use, the memory 1420 may contain, among other things, at least a portion of the storage operating system of the storage server 108.

Also connected to the processor(s) 1410 through the interconnect 1430 are a network adapter 1440 and a storage adapter 1450. The storage adapter 1450 allows the storage server 108 to access a storage subsystem 105 and may be, for example, a Fibre Channel adapter or a SCSI adapter. The network adapter 1440 provides the storage server 108 with the ability to communicate with remote devices, such as clients 104, over a network 106 and may be, for example, an Ethernet adapter or Fibre Channel adapter.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for updating file objects based on modifications to file representations of data entities, said method comprising:
    generating a file representation of a data entity in a storage system;
    generating a first object representation of the data entity in the storage system;
    generating a first object namespace redirector that includes a pointer to the first object representation;
    generating a file namespace redirector that includes a pointer to the file representation and a pointer to the first object namespace redirector; and
    if the file representation has been modified,
        copying data content of the modified file representation to a second object representation;
        generating a second object namespace redirector that includes a pointer to the second object representation; and
        modifying the first object namespace redirector pointer to point to the second object namespace redirector.

2. The method of claim 1, wherein said copying comprises cloning.

3. The method of claim 1, further comprising waiting until a holdoff period expires prior to copying data content of the modified file representation to the second object representation.

4. The method of claim 1, further comprising:
    if the object representation has been modified and if the file representation is locked for writing, waiting until a write lock on the file representation is released prior to copying data content of the modified object representation to update the file representation.

5. The method of claim 1, further comprising:
    allocating object identifiers (OIDs) for each of multiple, sequential historical versions of the object representation; and
    associating the OIDs with respective object namespace redirectors.

6. A method for providing access to consistent object and file representations of data entities in a storage system, said method comprising:
    creating and storing a first representation of a data entity in a storage system;
    creating and storing a second representation of the data entity in the storage system;
    wherein a first namespace is used by a first protocol to locate the first representation, and a second namespace is used by a second protocol to locate the second representation;
    creating a first namespace redirector in the first namespace, wherein the first namespace redirector includes a pointer to the first representation;
    creating a second namespace redirector in the second namespace, wherein the second namespace redirector includes a pointer to the second representation and a pointer to the first namespace redirector; and modifying the first object namespace redirector pointer to point to the second object namespace redirector.

7. The method of claim 6, further comprising:

in an event that the first representation has been modified, copying the modified first representation to update the second representation; and in an event that the second representation has been modified, copying the modified second representation to update the first representation, and wherein modifications made via the first protocol are accessible via the second protocol, and modifications made via the second protocol are accessible via the first protocol.

8. The method of claim 7, further comprising waiting until a holdoff period expires for the first representation prior to copying the second representation to update the first representation.

9. The method of claim 7, further comprising in an event that the second representation is locked for writing, waiting until a write lock on the second representation is released prior to copying the modified first representation to update the second representation.

10. The method of claim 6, further comprising:

creating a third namespace redirector in the first namespace to point to a previous version of the first representation, wherein, when the first representation is modified, an unmodified version of the first representation is retained as the previous version.

11. The method of claim 10, further comprising:

allocating identifiers for the first representation and each of multiple previous versions of the first representation; and associating the identifiers with the respective first namespace redirectors.

12. One or more non-transitory machine-readable storage media having program code for updating file objects based on modifications to file representations of data entities stored therein, the program code to:

generate a file representation of a data entity in a storage system;

generate a first object representation of the data entity in the storage system;

generate a first object namespace redirector that includes a pointer to the first object representation;

generate a file namespace redirector that includes a pointer to the file representation and a pointer to the first object namespace redirector; and if the file representation has been modified, copy data content of the modified file representation to a second object representation;

generate a second object namespace redirector that includes a pointer to the second object representation; and modify the first object namespace redirector pointer to point to the second object namespace redirector.

13. The machine-readable storage media of claim 12, wherein the program code to copy comprises program code to clone.

14. The machine-readable storage media of claim 12, further comprising program code to wait until a holdoff period expires prior to copying data content of the modified file representation to the second object representation.

15. The machine-readable storage media of claim 12, further comprising program code to:

if the object representation has been modified, and in an event that the file representation is locked for writing, wait until a write lock on the file representation is released prior to copying data content of the modified object representation to update the file representation.

16. The machine-readable storage media of claim 12, further comprising program code to:

allocate object identifiers (OIDs) for each of multiple, sequential historical versions of the object representation; and associate the OIDs with respective object namespace redirectors.

* * * * *